March 9, 1926.

H. E. MORSE

FLEXIBLE COUPLING

Filed Oct. 21, 1920

Inventor
Herman E. Morse
By R. D. Trogner.
his Attorney

March 9, 1926.
H. E. MORSE
1,575,927
FLEXIBLE COUPLING
Filed Oct. 21, 1920      2 Sheets-Sheet 2
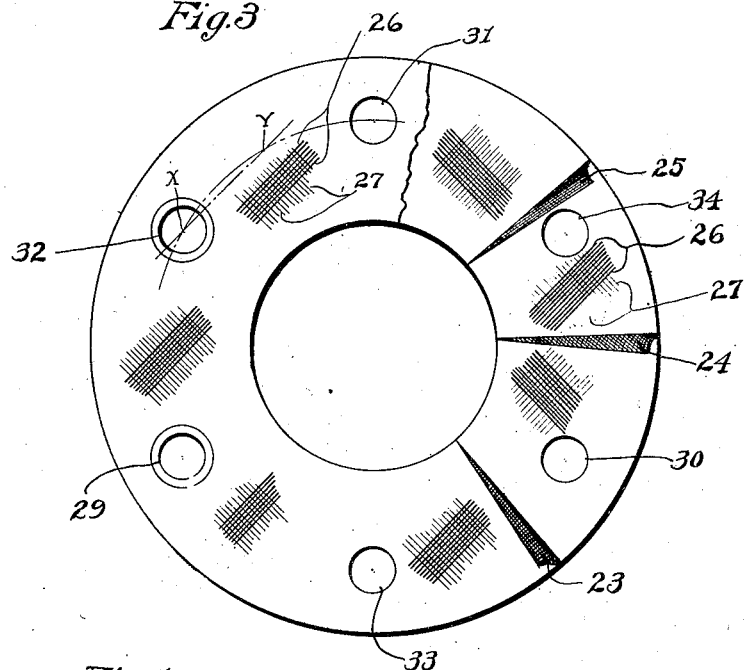
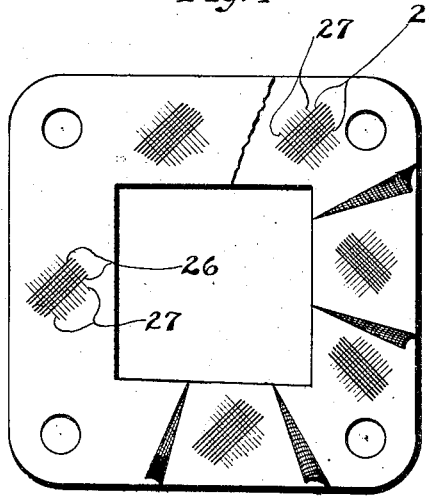
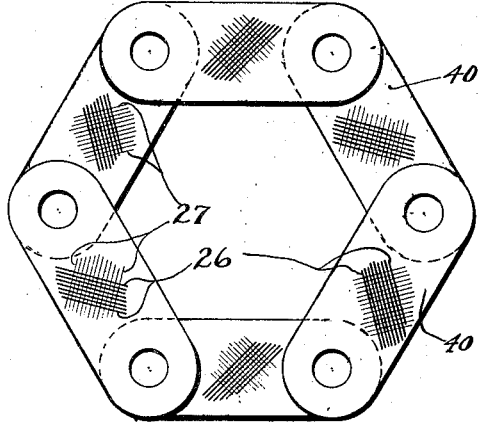
Inventor
*Herman E. Morse*
By *R. D. Trogner*
his Attorney Patented Mar. 9, 1926.

1,575,927

UNITED STATES PATENT OFFICE.

HERMAN E. MORSE, OF AKRON, OHIO, ASSIGNOR TO THE GOODYEAR TIRE & RUBBER COMPANY, OF AKRON, OHIO, A CORPORATION OF OHIO.

FLEXIBLE COUPLING.

Application filed October 21, 1920. Serial No. 418,491.

*To all whom it may concern:*

Be it known that I, HERMAN E. MORSE, a citizen of the United States, residing at Akron, in the county of Summit and State of Ohio, have invented new and useful Improvements in Flexible Couplings, of which the following is a specification.

My invention relates to flexible couplings and it particularly has to do with the flexible disk members that are interposed between the driving and driven members of such couplings.

The various objects and advantages to be obtained from practicing my invention will be apparent from a perusal of the accompanying specification. In the drawings, which show a preferred embodiment of my invention;

Fig. 3 is a plan view of a disk constructed in accordance with my invention and illustrating the manner in which the successive plies of fabric are assembled to form a complete disk member.

Fig. 4 is a plan view of a disk member employed in a flexible coupling, each of the spider members of which has two driving lugs, and Fig. 5 is a plan view of a set of connecting links constructed in accordance with my invention and assembled in a flexible coupling.

Figure 1:
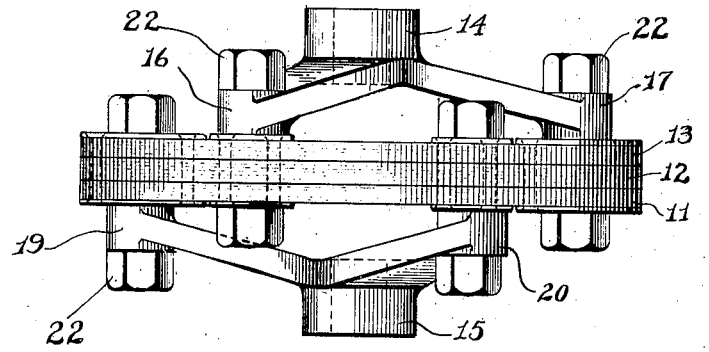
Fig. 1 illustrates, in side elevational view, a shaft coupling of conventional design embodying flexible disk members constructed in accordance with my invention.
Figure 2:
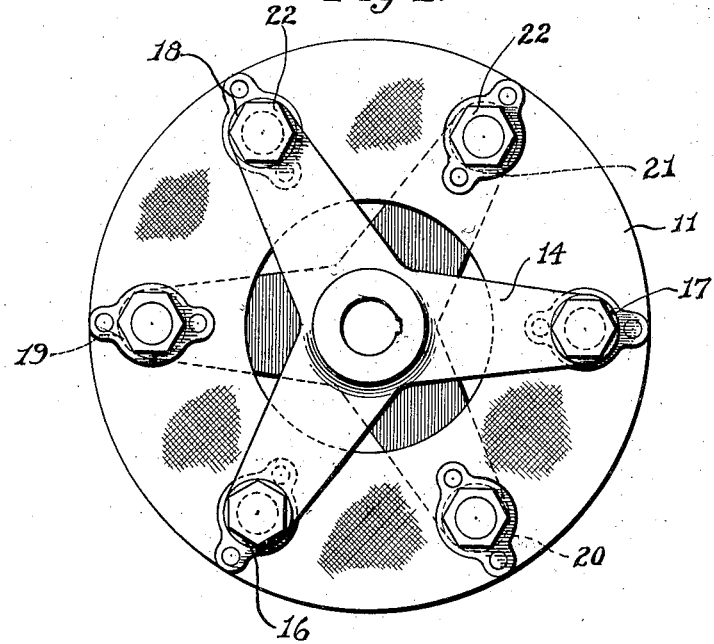
Fig. 2 is an end elevational view of the coupling shown in Fig. 1.

The flexible coupling shown in Figs. 1 and 2 of the drawings, is of conventional design and preferably embodies a set of three disk members 11, 12 and 13 that are interposed between a pair of spider members 14 and 15. A series of uniformly spaced driving lugs 16, 17 and 18 serve to connect the driving spider 14 to the disk members and a similarly arranged group of lugs 19, 20 and 21 connect the driven member to the several disks. The driving lugs 16 to 21 are secured to the disks by a plurality of nuts 22. It should be understood, however, that this particular type of universal coupling is merely typical of a class of couplings which employ flexible disks that may be constructed in accordance with my invention. Particular applications of this form of flexible coupling are found in the driving connections between the units of motor-generator sets, in automobile power transmission mechanism, and in other similar apparatus.

The disks 11, 12 and 13 are of like construction, the disk 11 being shown in Fig. 3 of the drawings as a representative disk embodying the elements of my invention. This disk comprises a plurality of superimposed layers of fabric 23, 24 and 25 that are secured together by means of a suitable binder and are arranged in such manner that the warp threads 26 of one layer of fabric register with the weft threads 27 of other layers of fabric, as indicated in the drawing by the correspondingly marked groups of parallel lines. For clearness of illustration, the warp threads of the fabric are indicated by relatively heavy lines whereas the weft threads are represented by relatively light lines. There is, however, no necessary difference in the character or weight of the warp and weft threads.

This registered relation of the warp and weft elements may either be provided by arranging the various layers of fabric with their respective warp and weft elements extending in the same direction or by arranging the layers of fabric in groups and registering the warp elements of one group with the weft elements of an adjacent group. This is a particularly desirable arrangement where the weave or texture of the fabric provides a cloth having greater strength in the direction of the warp elements than in the direction of the weft elements whereas the former relation is more desirable if square-woven fabric is employed as a material from which the disk is constructed.

After the several layers of fabric have been built up in one of the manners described, the fabric is subjected to a treatment that unites the several layers into a composite disk in which the warp and weft elements of the individual layers of fabric bear the relations indicated. For this purpose a binder embodying rubber may be used. In such case the fabric may be rubberized by a calendering operation or by being dipped into a rubber solution, after which the disk is vulcanized to harden and cure the binder. Another form of treatment is the impregnation of the mass of fabric in its assembled relation with a binding compound such, for instance, as a phenolic condensation product, for example, bakelite, or other compound, and the cure of the disk under heat and pressure to harden the binder. The type of binder employed is, however, immaterial to my invention.

The series of openings 29 to 34 inclusive, that respectively receive the driving lugs 16 to 21 inclusive, are arranged in such relation with respect to the elements of the fabric that neither the warp nor the weft elements of the fabric are in alignment with a line connecting any two adjacent lug-receiving openings.

In the particular application that I have chosen as illustrative of the principles of my invention, six openings for the driving lugs are employed, the warp elements 26 of one of the layers of fabric being arranged substantially parallel to a line joining the center "$x$" of one of the lug-receiving openings and a point "$y$" located at the same radial distance from the center of the disk and midway between the center of the first lug receiving opening and the next adjacent opening as indicated in Fig. 3.

This arrangement insures that at no place around the periphery of the disk will the warp elements or weft elements of the fabric lie in alignment with a line connecting successive lug-receiving openings. The virtue of this specific arrangement of driving openings relative to the direction of the warp and weft elements of the fabric lies in the more uniform flexibility and extensibility of the composite fabric disk between the successive driving lugs that fit within these openings. It will be noted, for instance, that the warp elements 26 of one of the layers of fabric are positioned at substantially 15° angularity with a line connecting the centers of the adjacent lug-receiving openings 31 and 32 whereas the weft elements 27 are disposed in like angularity with a line joining the succeeding pair of lug-receiving openings 29 and 33. Such a uniform extensibility of the fabric between the successive pairs of lug-receiving openings insures that the driving torque transmitted from the driving member 14 to the driven member 15 through the interposed disks of fabric will be uniformly distributed between the successive driving lugs and that each portion of each disk will assume its proper proportion of the total torque and give increased strength to a driving connection embodying a specified amount of fabric.

In order that the several disks may be so assembled between the driving and driven members as to uniformly distribute the transmitted torque, one pair of the driving lug openings, such, for instance, as openings 29 and 32, is distinguishably marked by surrounding the opening with a distinctive color of rubber, or other marking means, in order that when the several disks are assembled between a pair of spider members in a universal coupling, each lug will have placed thereon one of the distinguishably marked openings if the coupling is of the type illustrated in Figs. 1 and 2 of the drawings. If more than three disk elements are employed in such a flexible coupling, a proportionate number of distinguishably marked openings is placed over each of the driving lugs.

Figure 4 of the drawing illustrates a fabric disk made up in accordance with my invention for use in a driving connection embodying two driving lugs on each of the spider members. In this instance, the holes for the driving lugs are so arranged that the warp and weft cords of the fabric are disposed at an angle of substantially 45° with a line connecting successive driving holes. A very uniform distribution of the driving stresses throughout the disk is obtained by this arrangement. These disks are assembled in the same manner as the disk illustrated in Fig. 3 of the drawings.

Attention is also directed to the fact that when the stresses are uniformly distributed through both the warp and weft threads, as in this instance where they are disposed at substantially 45° with the line of application of the driving stresses, the increased degree of flexibility of the fabric in the line of application of the stresses insures better wearing properties than are obtained if the driving stresses are imposed longitudinally of either the warp or the weft elements.

Figure 5 shows a construction in which the flexible coupling is made up of a plurality of flexible links 40 that connect the spider members of the coupling. Each of the flexible links 40 is built up of successive plies of fabric arranged with the threads extending at an angle to the line connecting the holes for the driving lugs. This angularity is preferably 45° when the fabric is of equal strength in the direction of the warp and weft elements, although, when fabric is employed in which the warp threads are of greater strength than the weft threads, this angularity may be changed to impose the most desirable distribution of stresses between the warp and weft elements.

Although I have described but a limited number of the various applications of my invention that may be made, it is to be understood that I intend to claim all of the modifications of my invention as fully and as completely as the prior art may permit and I desire, therefore, that only such limitations shall be imposed as are indicated in the appended claims.

What I claim is:

1. A flexible member for driving connections comprising superimposed layers of fabric united by a binder and arranged with the warp and weft elements of one layer respectively registering with the weft and warp elements of the adjacent layers.

2. A flexible disk for driving connections comprising prearranged superimposed layers of fabric united by a binder and having driving holes so positioned that a line connecting any pair of adjacent holes is oblique with either the warp or weft elements of the fabric.

3. A flexible disk for driving connections comprising superimposed layers of fabric united by a binder and arranged with the warp and weft elements of one layer respectively in registered relation with the weft and warp elements of other layers, a series of successive driving holes being placed with a line connecting their centers in angularity with both the warp and weft elements of the fabric.

4. A flexible member for driving connections comprising superimposed layers of fabric united by a binder and having a plurality of driving holes, one pair of the holes being located in prearranged relation with respect to the warp and weft elements of the fabric and distinguishably marked to differentiate them from the remaining holes.

5. A flexible disk for driving connections comprising superimposed layers of fabric united by a binder and arranged with the warp and weft elements of each layer of fabric respectively registering with the weft and warp elements of the adjacent layers, said disk having a plurality of driving holes located in prearranged relation with respect to the warp and weft elements of the fabric and distinguishably marked to differentiate them from the remaining holes.

In witness whereof I have hereunto signed my name.

HERMAN E. MORSE.